(12) United States Patent
LaMothe

(10) Patent No.: US 6,542,832 B1
(45) Date of Patent: Apr. 1, 2003

(54) ERROR DETECTION AND CORRECTION SYSTEM FOR USE WITH DUAL-PULSE OUTPUT METERING DEVICES

(75) Inventor: Brian LaMothe, Conrad, IA (US)

(73) Assignee: Fisher Controls International, Inc., Austin, TX (US)

( * ) Notice: Subject to any disclaimer, the term of this patent is extended or adjusted under 35 U.S.C. 154(b) by 0 days.

(21) Appl. No.: 09/376,844

(22) Filed: Aug. 18, 1999

(51) Int. Cl.$^7$ .......................... G01F 1/00; G01F 25/00; G06F 11/00
(52) U.S. Cl. .......................... 702/45; 702/50; 714/812; 73/1.28; 73/861.79
(58) Field of Search ................................ 714/709, 798, 714/812, 814, 820, 818, 819; 702/45, 46, 79, 89, 100, 104, 114, 177, 72, 106, 47, 50, 55, 127, 128, 170, 171; 73/521, 1.27, 1.28, 861.79, 861.81, 861.83

(56) References Cited

U.S. PATENT DOCUMENTS

| | | | |
|---|---|---|---|
| 5,266,953 A | * 11/1993 | Kelly et al. | 342/47 |
| 5,917,870 A | * 6/1999 | Wolf | 375/356 |
| 5,932,812 A | * 8/1999 | Delsing | 73/861.02 |
| 6,092,409 A | * 7/2000 | Patten et al. | 73/1.34 |

OTHER PUBLICATIONS

Manual of Petroleum Measurement Standards Chapter 5, Section 5, Jun. 1982.*
Elliot, Technical Bulletin, Dual Pulse Flowmeter Pulse Fidelity Checking, Sep. 1997.*
Manual of Petroleum Measurement Standards Chapter 5, Section 5, Jun. 1982.*
International Organization for Standardization; Petroleum liquids and gases—Fidelity and security of dynamic measurement—Cabled transmission of electric and/or electronic pulsed data, Dec. 1, 1982.
Kenneth D. Elliott, Dual Pulse Flowmeter Pulse Fidelity Checking, Sep. 1, 1997.
American Petroleum Institute, Manual of Petroleum Measurement Standards Chapter 5—Metering, Jun. 1982.

* cited by examiner

Primary Examiner—Albert Decady
Assistant Examiner—Matthew C. Dooley
(74) Attorney, Agent, or Firm—Conley Rose, P.C.

(57) ABSTRACT

An error correction and detection system for a dual-pulse output metering device is provided. The system detects errors in the dual-pulse output of the metering device by comparing the current phase difference it between the pulse streams to a desired or known phase difference and generating an error signal if the current phase difference is different from the desired phase difference. If an error signal is generated, the system additionally accounts for the error and provides a corrected pulse count output by either discarding the extra pulse, or calculating the number of missed pulses, and adding the missing number of pulses to the pulse count output.

16 Claims, 3 Drawing Sheets

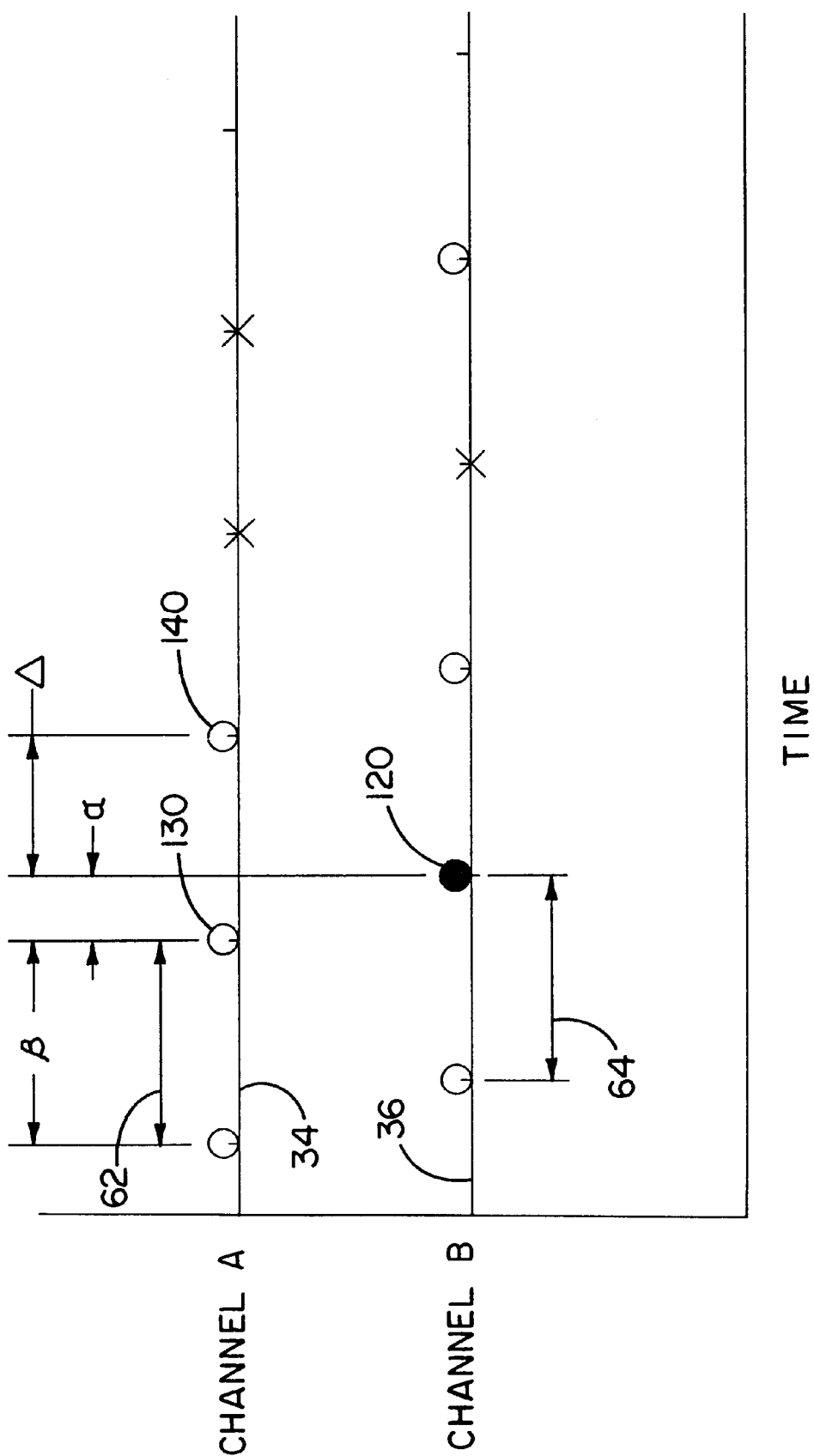

ERROR DETECTION AND CORRECTION SYSTEM FOR USE WITH DUAL-PULSE OUTPUT METERING DEVICES

FIELD OF THE INVENTION

The present invention generally relates to measuring devices and, more particularly, to dual-pulse output measuring devices for metering fluid flow.

BACKGROUND OF THE INVENTION

Repeated measurement and correction of fluid flow is important to the proper operation of many industries. For example, in the petroleum industry, e.g., natural gas, gasoline, etc, cumulative measurements are required at many stages during production, transportation, refining, and selling of the product. Such measurements form the basis for royalties, physical and custody transfer accounting, and provide means for stock and loss control.

The measurement of such fluid flow is typically performed by an electrical or electronic device such as a turbine meter or the like. The turbine meter typically includes a turbine wheel with angled blades which are adapted to rotate as flowing fluid imparts force thereto. The turbine blades typically rotate past a pair of spaced sensors or transducers with the signals or pulses generated by the transducers being used to calculate a value indicative of fluid flow.

Such measuring devices are therefore dependent on the received pulses being accurate. However, noise or transients in the electrical transmission lines can sometimes result in false pulses, and broken or malfunctioning sensors or turbines can result in missed pulses. Other sources of errors in the pulse count output can result from such things as electromagnetic interference, power supply variations and or interruptions, inadequate signal level as a result of line loss, common mode noise induced in cabling, series mode noise induced in cabling, noise introduced from ground loop problems, excessive gain in frequency response of the system elements, spurious signals induced from other meters sharing the same multicore cable, short circuits or open circuits of conductor pairs, short circuits of either conductor to ground or shield, bad connections, temperature variations and extremes, vibration shock, and adverse environmental conditions.

Given the importance of accurate fluid metering, and the widespread use of such dual-output metering devices in the global marketplace, governing standards for the operation of such devices have been promulgated. The International Organization for Standardization (ISO) and the American Petroleum Institute (API) both advocate a five level standard establishing guidelines for insuring the fidelity and security of pulse data transmission systems (including the aforementioned dual turbine meters). The standard levels range from a least stringent level E, wherein accuracy is achieved solely by correctly installing apparatus of good quality, to a most stringent level A, wherein errors in the pulse count are not only detected, but corrected as well.

In one known device, a timer is used to determine if the pulses from both channels arrive simultaneously. If the pulses do arrive simultaneously, this is interpreted as common mode noise and both pulses are disregarded, even though one pulse may be valid. No correction for errors in the pulse count is provided.

SUMMARY OF THE INVENTION

In accordance with one aspect of the present invention, a dual pulse error detection and correction system is provided which includes first and second sensors, a memory, and a processor. The first and second sensors are adapted to generate first and second pulses related by a phase difference, and the processor is adapted to receive the first and second pulses from the sensors, calculate a current phase difference, compare the current phase difference to a desired phase difference stored in the memory, and generate an error signal if the current phase difference is not equal to the desired phase difference.

In accordance with other aspects of the invention, the processor is adapted to generate a corrected pulse count output. The corrected pulse count output accounts for extra pulses as well as missed pulses.

In accordance with another aspect of the present invention, a method of detecting and correcting pulse count errors of a dual pulse output related by a phase difference is provided which comprises the steps of receiving first and second pulses from a dual pulse output, calculating a phase difference between the first and second pulses, comparing the calculated phase difference to a desired phase difference, and generating an error signal if the calculated phase difference is not equal to the desired phase difference.

In accordance with other aspects of the invention, the invention further includes the step of calculating the desired phase difference before the receiving step, with the desired phase difference being determined based on a sampling of first and second pulses. Alternatively, the desired phase difference may be calculated based on an average phase difference.

These and other aspects and features of the present invention will become more apparent from the following detailed description when taken into conjunction with the accompanying drawings.

BRIEF DESCRIPTION OF THE DRAWINGS

FIG. 3 is a graph depicting sample pulse streams from a dual output metering device.

Figure 1:
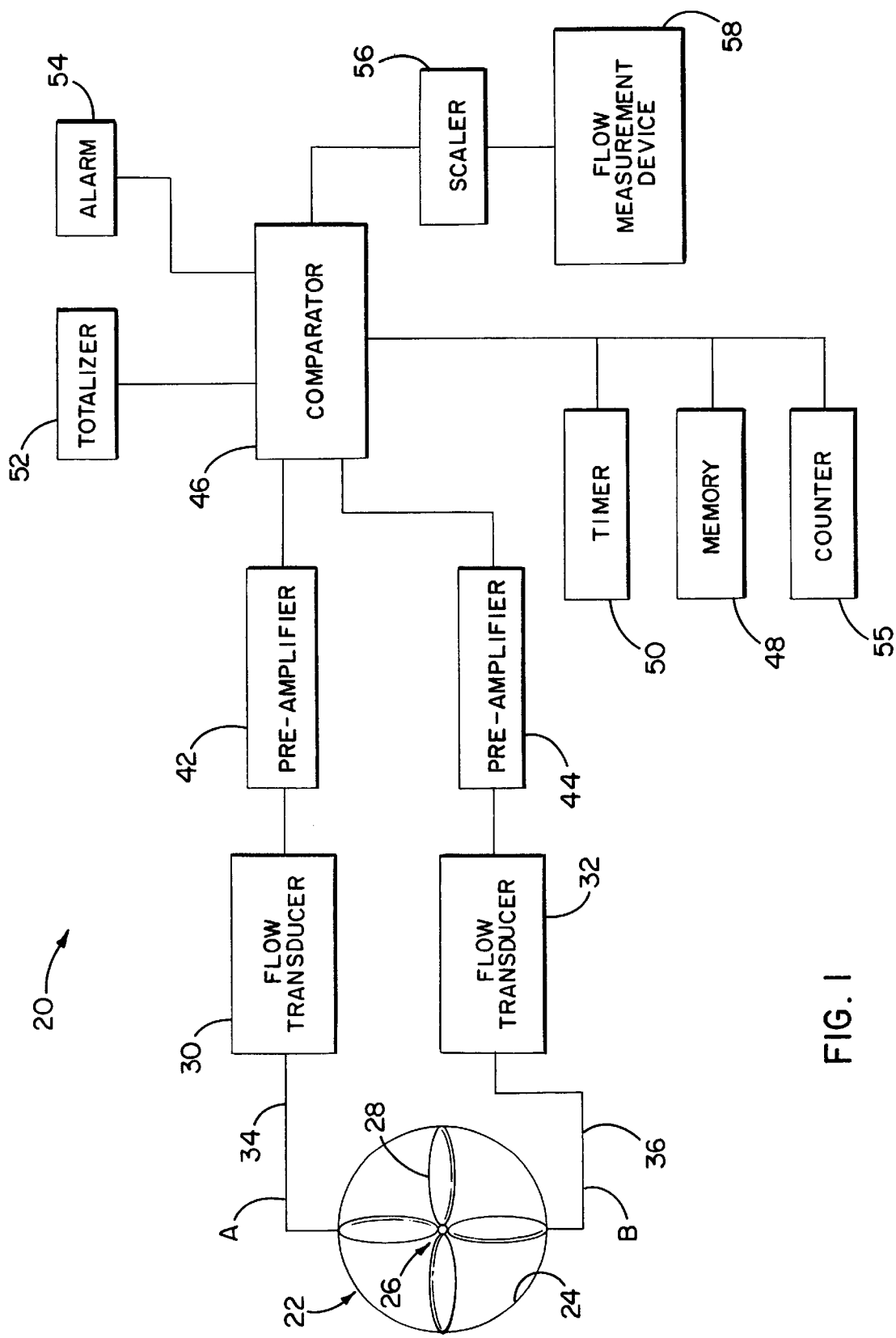
FIG. 1 is a block diagram of an error detecting and correcting system according to the present invention.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions, and equivalents found within the spirit and scope of the invention as defined by the appended claims.

DETAILED DESCRIPTION OF THE PREFERRED EMBODIMENTS

Referring now to the drawings, and with specific reference to FIG. 1, an error detection and correction system according to the present invention is generally indicated by reference numeral 20. While the system 20 is depicted in use with a turbine meter 22 it is important to understand that the system 20 has applicability to many other applications wherein dual pulse streams are provided at a known phase difference, and a corrected pulse count is desired as an output.

As shown in FIG. 1 the turbine meter 22 includes a housing or conduit 24 in which a turbine 26 is mounted for rotation. The turbine 26 includes a plurality of turbine blades 28 which are contoured and shaped to cause rotation of the turbine 26 as fluid (not shown) flows within the conduit 24 in a direction normal to a drawing.

First and second sensors or flow transducers 30 and 32 are mounted proximate the turbine blades 28 such that a pulse is generated thereby each time a turbine blade 28 rotates past one of the sensors 30 and 32. In so doing, a first pulse stream 34 is generated in channel A, and a second pulse stream 36 is generated in channel B. The first and second flow transducers 30 and 32 are adapted to communicate the pulses downstream to pre-amplifiers 42 and 44. Pre-amplifiers 42 and 44 provide amplified and clean pulse streams to a comparator or processor 46. The processor 46 may be provided in the form of an application specific integrated circuit (ASIC), a programmable processor adapted to have software loaded and deleted therefrom, firmware, and the like. In an alternative embodiment, the invention may be implemented strictly in hardware, without reliance on software.

A memory 48 is in communication with the processor 46 and adapted to store information therein. The memory can be of any conventional type of memory including magnetically readable, optically readable, RAM, ROM, EEPROM, etc. The processor is also in communication with a timer 50, a totalizer 52, an alarm or other operator interface module 54, a counter 55, as well as a scaler 56, the importance in function of all which will be discussed in further detail herein.

The system 20 therefore is adapted to receive dual pulse inputs along channels A and B, and generate a pulse count output for use by a flow measurement device 58. The system 20 ensures that the pulse count output provided by the system is accurate and thus provides information to the flow measurement device 58 which will accurately measure the flow of fluid through the conduit 24.

Figure 2:
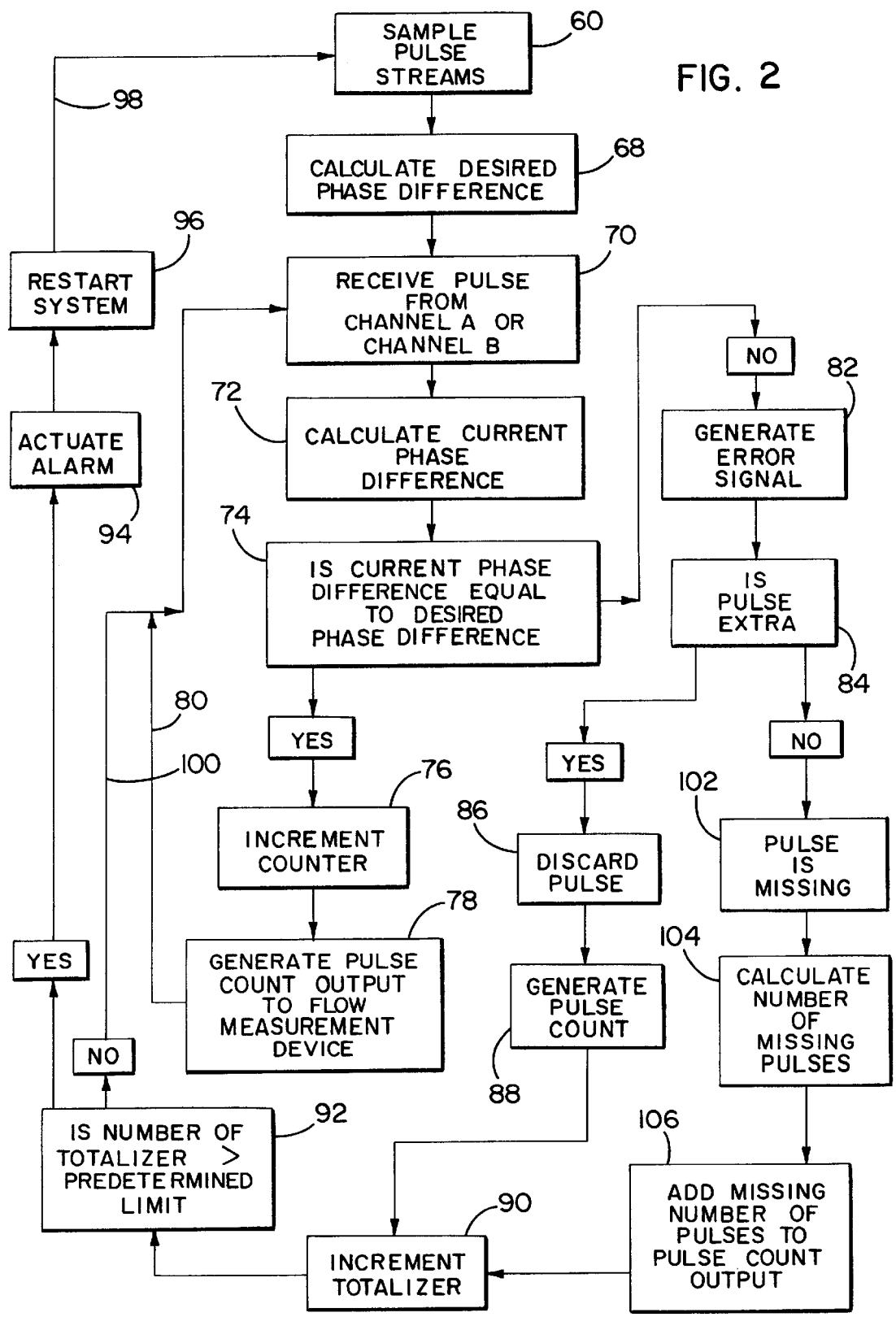
FIG. 2 is a flow chart of logic employed by the system of the present invention.

In operation, FIG. 2 shows an overall flow chart of logic employed by the present invention. The system 20 provides not only a mechanism for detecting errors in the pulse count output, but also for correcting for such errors, and providing a corrected pulse count to the flow measurement device 58. The system 20 is able to do so by, among other things, comparing a measured or current phase difference CP between pulses on channels A and B, to a desired or known phase difference DP therebetween.

For example, FIG. 3 shows an exemplary set of pulse streams 34 and 36 in channels A and B. As shown therein, pulses are generated in the first pulse stream 34 at a cycle time or a period 62. Similarly, the pulses from the second pulse stream 36 in channel B are generated at a cycle time or period 64. However, such pulses are not generated simultaneously, but rather are separated by a particular desired phase difference DP. Therefore, if none of the aforementioned problems such as transients, and malfunctioning equipment are present, the pulses arrive at the periods 62 and 64 and are separated between the channels at the desired phase difference DP.

The desired phase difference DP may be arrived at by first sampling the pulse streams 34 and 36 on channels A and B, as indicated by step 60 in FIG. 2, and then calculating the desired phase difference DP, as indicated by step 68, within the processor 46. This desired phase difference DP can be measured in terms of degrees, ranging from zero to 360°, with the present invention being scaled to a 250 unit scale. More specifically, the phase difference between the first two pulses can be calculated, and then if subsequent pulses result in a similar phase difference plus or minus an acceptable margin, the phase difference between the first two pulses is stored as the desired phase difference DP. Alternatively, the desired phase difference DP can be arrived at by using an average phase difference of a predetermined number of pulses.

Once the known or desired phase difference DP is calculated, the pulse streams 34 and 36 in channels A and B are continually monitored, as indicated by step 70, and the current phase difference, CP, is calculated, as indicated by step 72. The current phase difference CP can be calculated using the following inventive system. Referring now to FIG. 3, if it is assumed that the currently arriving pulse is a pulse 120 on channel B, the current phase difference can be calculated using the quotient $\alpha/\beta$, wherein $\alpha$ is equal to the time between the current pulse 120 on channel B and the last known pulse 130 received on channel A, and $\beta$ is equal to the last known period 62 for channel A. This represents a stark improvement over prior art methods for calculating phase difference in that the invention system uses known time values. The prior art was not analyzed phase difference in connection with such metering devices, but typically calculates the phase difference, for general applications using the quotient $\alpha/(\alpha+\Delta)$, wherein $\alpha$ is equal to the time between the current pulse 120 on channel B and the last pulse 130 received on channel A, and $\Delta$ is equal to the estimated time between the last received pulse 130 on channel A and the next expected pulse 140 on channel A. However, since the period 62 is subject to change, the estimated time until the next pulse 140 is also subject to change, and thus the prior art method of calculating phase difference, if employed at all, would be more prone to erroneous results. Integer and floating point arithmetic can be used, making the results scalable to various speed microprocessors.

Once the current phase difference CP is calculated, the processor 46 compares the current phase difference CP to the desired phase difference DP, as indicated by step 74. If the current phase difference CP is equal to the desired phase difference DP, the pulse is deemed to be an accurate and expected pulse, and is used in calculating the pulse count output of the system 20. More specifically, the pulse counter 55 is incremented, as indicated by step 76, and the pulse count output is communicated to the flow measurement device 58, as indicated by step 78. Depending on the type of microprocessor employed by the flow measurement device 58, the output signal of step 78 can be scaled by the scaler 56 using, among other things, integer and floating point arithmetic, or the like. The system is then repeated as indicated by arrow 80.

If the current phase difference CP is not equal to the desired phase difference DP, an error signal is generated as indicated by step 82. Such an error signal can be communicated to the alarm 54, or to any other type of device providing an indication to an operator of the system 20. If an error signal is generated, the system 20 proceeds to determine if the error is the result of an extra pulse being received, or if a pulse or pulses which should have been received, was or were missed. As shown in FIG. 2, the first inquiry of the system 20 is whether the pulse is an extra pulse, as indicated by step 84. This determination can be made by comparing the current phase difference CP to the desired phase difference DP. If the current phase difference CP is less than the desired phase difference DP, the pulse is received prior to its expected period, and is deemed to be extra. In such an event, the pulse is disregarded and discarded, as indicated by step 86. A pulse count disregarding the extra pulse is then generated by step 88 for use by the flow measurement device 58.

Each time an error is generated, the totalizer 52 is incremented by one unit, as indicated by step 90. Once the value of the totalizer 90 exceeds a predetermined maximum number of errors, as indicated by step 92, the alarm 54 is actuated, as indicated by step 94, and the entire system 20 is restarted, as indicated by step 96. The system 20 is restarted by repeating the aforementioned steps starting with step 60, wherein the pulse streams are sampled to determine the desired phase difference DP. This restarting of the system is indicated by arrow 98. In the event that the value of the totalizer 52 has not yet exceeded the predetermined maximum number of errors, the system 20 does not completely restart, but rather returns to step 70, as indicated by arrow 100. Every time a correct pulse is received, the totalizer 52 may be cleared and reset to zero.

Returning again to step 84, if an error is detected and it is determined that an extra pulse is not present, the system 20 concludes that the error signal generated is the result of a pulse or pulses being absent, as indicated by step 102. Since there may be multiple missing pulses, the system 20 calculates the number of missing pulses as indicated by step 104. FIG. 3 indicates a situation wherein three consecutive pulses have been missed (as denoted by an "X" character), two on channel A, and one on channel B. It can be calculated that three such pulses have been missed based on the known phase difference, and the last known period or cycle time for each channel. For example, if the last known period for a channel A is two seconds, and it has been four seconds since a pulse has been received, it can be calculated that two pulses have been missed. Similarly, if the last known period for a channel B is two seconds, and it has been two seconds since a pulse has been received, it can be calculated that one pulse has been missed. The number of missed pulses from channel A and channel B can then be summed, as indicated by step 106, and added to the pulse count output to the flow measurement device 58.

The system 20 then returns to step 90, as indicated in FIG. 2, wherein since an error has occurred, the counter 55 is incremented, and the total number of incorrect pulses is compared to the predetermined maximum number of errors, as indicated by step 92. If the predetermined maximum number of errors is exceeded, the alarm is actuated, as indicated by step 94, and the system is restarted, as indicated by step 96 and arrow 98. If the maximum number has not yet been exceeded, the system repeats as indicated by arrow 100.

From the foregoing, it can therefore be appreciated that the present invention provides not only a system for detecting errors in the pulse count output of a dual-pulse output metering device, but also for correcting the errors and providing a corrected pulse count output. The system is able to do so by using, among other things, the phase difference between the pulse streams of the dual-pulse outputs, as well as the last known period of each pulse stream.

What is claimed is:

1. A dual pulse detection and correction system for a fluid flow metering device, the dual pulse detection and correction system comprising:
   a turbine within the fluid flow and rotating in response to the fluid flow;
   first and second sensors in operational relationship to the turbine, the first and second sensors adapted to generate first and second pulses responsive to rotation of the turbine, the pulses related by a phase difference;
   a memory;
   a processor adapted to receive the first and second pulses from the sensors, calculate a current phase difference, compare the current phase difference to a desired phase difference stored in the memory, and generate an error signal if the current phase difference is not equal to the desired phase difference;
   wherein the processor is further adapted to generate a corrected pulse count output.

2. The dual pulse error detection and correction system of claim 1 wherein the processor is further adapted to determine if one of the first and second pulses is an extra pulse, and discard the extra pulse in generating the corrected pulse count output.

3. The dual pulse error detection and correction system of claim 1 wherein the processor is further adapted to determine if a pulse is missing and calculate the number of missing pulses in generating the corrected pulse count output.

4. The dual pulse error detection and correction system of claim 1 wherein the processor is further adapted to calculate the desired phase difference based on an initially sampled number of pulses.

5. The dual pulse error detection and correction system of claim 1 further including a totalizer, the totalizer being incremented by one every time an error signal is generated.

6. The dual output error detection and correction system of claim 5 further including an alarm, the alarm being actuated when the totalizer exceeds a predetermined limit.

7. The dual pulse error detection and correction system of claim 1 further including a scaler, the pulse count output of the processor being communicated to the scaler, the scaler being adapted to use integer and floating point arithmetic making the output scalable to different speed microprocessors.

8. A dual pulse detection and correction system, comprising:
   first and second sensors adapted to generate first and second pulses related by a phase difference;
   a memory;
   a processor adapted to receive the first and second pulses from the sensors, calculate a current phase difference, compare the current phase difference to a desired phase difference stored in the memory, and generate an error signal if the current phase difference is not equal to the desired phase difference;
   a totalizer, the totalizer being incremented by one every time an error signal is generated;
   an alarm, the alarm being actuated when the totalizer exceeds a predetermined limit; and
   wherein the desired phase difference is recalculated if the totalizer exceeds a predetermined limit.

9. In a fluid flow metering device comprising a turbine rotating within the fluid flow, a method of detecting and correcting pulse count errors of a dual-pulse output related by a phase difference comprising the steps of:
   receiving first and second pulses responsive to rotation of the turbine from the dual pulse output;
   calculating a phase difference between the first and second pulses;
   comparing the calculated phase difference to a desired phase difference;
   generating an error signal if the calculated phase difference is not equal to the desired phase difference;
   generating a pulse count output; and
   correcting the pulse count output when the comparing step determines the calculated phase difference is not equal to the desired phase difference.

10. The method of claim 9 wherein the correcting step includes the step of determining if one of the first or second pulses is an extra pulse, and discarding the extra pulse in generating the pulse count output.

11. The method of claim 9 wherein the correcting step includes the step of determining if a pulse is missing from the dual-pulse output and adding the missing pulse to the pulse count output.

12. The method of claim 11 wherein the correcting step further includes the step of determining the number of missing pulses and adding the determined number of missing pulses to the pulse count output.

13. The method of claim 9 wherein the desired phase difference is calculated before the receiving step, the desired phase difference being determined based on a sampling of received first and second pulses.

14. The method of claim 13 further including the step of incrementing a counter every time an error signal is generated.

15. The method of claim 14 further including the step of actuating an alarm when the counter exceeds a predetermined limit.

16. A method of detecting and correcting pulse count errors of a dual-pulse output related by a phase difference, the method comprising the steps of:

receiving first and second pulses from the dual pulse output;

calculating a phase difference between the first and second pulses;

comparing the calculated phase difference to a desired phase difference, wherein the desired phase difference is calculated before the receiving step, the desired phase difference being determined based on a sampling of received first and second pulses;

generating an error signal if the calculated phase difference is not equal to the desired phase difference;

incrementing a counter every time an error signal is generated; and recalculating the desired phase difference when the counter exceeds a predetermined limit.

* * * * *